(12) United States Patent
Shahbazi Avarvand

(10) Patent No.: US 11,851,096 B2
(45) Date of Patent: Dec. 26, 2023

(54) ANOMALY DETECTION USING MACHINE LEARNING

(71) Applicant: Siemens Mobility, Inc., New York, NY (US)

(72) Inventor: Forooz Shahbazi Avarvand, Berlin (DE)

(73) Assignee: Siemens Mobility, Inc., New York, NY (US)

( * ) Notice: Subject to any disclaimer, the term of this patent is extended or adjusted under 35 U.S.C. 154(b) by 921 days.

(21) Appl. No.: 16/837,406

(22) Filed: Apr. 1, 2020

(65) Prior Publication Data

US 2021/0309271 A1 Oct. 7, 2021

(51) Int. Cl.

| B61L 29/30 | (2006.01) |
|---|---|
| G06N 20/10 | (2019.01) |
| B61L 13/04 | (2006.01) |
| B61L 29/32 | (2006.01) |
| G05B 13/02 | (2006.01) |
| B61L 29/22 | (2006.01) |
| G05B 23/02 | (2006.01) |
| G06F 11/34 | (2006.01) |
| G06F 11/07 | (2006.01) |
| G06F 18/214 | (2023.01) |

(Continued)

(52) U.S. Cl.
CPC ............ B61L 29/30 (2013.01); B61L 13/04 (2013.01); B61L 13/042 (2013.01); B61L 29/226 (2013.01); B61L 29/32 (2013.01); G05B 13/027 (2013.01); G05B 23/0205 (2013.01); G06F 11/079 (2013.01); G06F 11/3452 (2013.01); G06F 18/214 (2023.01); G06F 18/2411 (2023.01); G06N 7/01 (2023.01); G06N 20/10 (2019.01)

(58) Field of Classification Search
CPC ...... B61L 13/04; B61L 13/042; B61L 29/226; B61L 29/24; B61L 29/288; B61L 29/30; B61L 29/32; G06N 7/01; G06N 20/00; G06N 20/10; G06F 11/079; G06F 18/214; G06F 18/2411; G06F 11/3452; G05B 13/0265; G05B 13/027
See application file for complete search history.

(56) References Cited

U.S. PATENT DOCUMENTS

| 9,378,079 B2 * | 6/2016 | Ivanova | G06F 11/3072 |
| 9,652,354 B2 * | 5/2017 | Filimonov | G06F 11/3452 |

(Continued)

*Primary Examiner* — Zachary L Kuhfuss
*Assistant Examiner* — Cheng Lin

(57) ABSTRACT

Examples of techniques for anomaly detection in a grade crossing prediction system are disclosed. Aspects include receiving a training data set comprising a plurality of labelled time series of signal values from a track circuit in a grade crossing predictor system, removing one or more non-unique values from each labelled time series of signal values in the plurality of labelled time series of signal values, extracting a plurality of features from the plurality of labelled time series of signal values, the plurality of features comprising: a number of signal values for each labeled time series of signal values in the plurality of labelled time series of signal values that are larger than a first threshold and a standard deviation for each labelled time series of signal values in the plurality of labelled time series of signal values, and training a machine learning algorithm utilizing the plurality of features.

20 Claims, 4 Drawing Sheets

(51) Int. Cl.
*G06F 18/2411* (2023.01)
*G06N 7/01* (2023.01)

(56) References Cited

U.S. PATENT DOCUMENTS

| | | | | |
|---|---|---|---|---|
| 10,409,789 B2* | 9/2019 | Zoll | .................. | G06F 16/215 |
| 10,698,038 B2* | 6/2020 | Hogan | .................. | G01R 31/52 |
| 10,710,616 B2* | 7/2020 | Hogan | .................. | B61L 1/20 |
| 10,850,756 B2* | 12/2020 | Hilleary | .................. | G01S 13/62 |
| 11,361,552 B2* | 6/2022 | Kale | .................. | G06N 3/049 |
| 11,436,076 B2* | 9/2022 | Kale | .................. | G06F 11/0739 |
| 2011/0213577 A1* | 9/2011 | Mousavi | .................. | G01R 19/2509 |
| | | | | 702/66 |
| 2019/0138939 A1* | 5/2019 | Devaraju | .................. | G05B 23/0289 |
| 2021/0027302 A1* | 1/2021 | Resheff | .................. | G06N 7/01 |
| 2021/0081293 A1* | 3/2021 | Sahni | .................. | G06Q 10/063114 |

* cited by examiner

200
ANOMALY DETECTION USING MACHINE LEARNING

BACKGROUND

The present invention relates to anomaly detection, and more specifically, to anomaly detection in track circuit devices using machine learning.

A track circuit is an electrical device utilized to detect the presence or absence of a train on rail tracks, used to inform signalers, and control relevant signals. An example track circuit includes a Grade Crossing Predictor (GCP) which is utilized to control and operate grade crossing signals. Grade crossing signals are the electronic warning devices for road vehicles at railroad grade crossings. The basic signal consists of flashing red lights, a crossbuck and a bell, attached to a mast. Typically, the signals will activate about 30 seconds before the train arrives at the railroad grade crossing. Gates are sometimes added to the grade crossing signal. The gates will be fully lowered 15 to 20 seconds before the train arrives. The gates will rise and the signals will shut off once the end of the train clears the island circuit. The island circuit refers to a track circuit that covers the track going through the road crossing and is a positive lock for the GCP.

These GCP track circuits can sometimes exhibit anomalous behavior. Currently, any anomalous behavior of the track circuit GCP devices are detected by manually going through the impedance (Z) level of the island circuit (IPIZ) and the magnitude of the raw data for the island circuit (IMAG) signals corresponding to each train crossing and identifying which sequences performed abnormal behavior. That is to say, the anomalies are detected by manually visualizing the IPIZ and IMAG signals and detecting them based on the expert feedback/decision on each figure individually. This approach is very time consuming and not optimal.

SUMMARY

Embodiments of the present invention are directed to a method for anomaly detection using machine learning. A non-limiting example of the method includes receiving, by a processor, a training data set comprising a plurality of labelled time series of signal values from a track circuit in a grade crossing predictor system, removing one or more non-unique values from each labelled time series of signal values in the plurality of labelled time series of signal values, extracting a plurality of features from the plurality of labelled time series of signal values, the plurality of features comprising: a number of signal values for each labeled time series of signal values in the plurality of labelled time series of signal values that are larger than a first threshold and a standard deviation for each labelled time series of signal values in the plurality of labelled time series of signal values, and training a machine learning algorithm utilizing the plurality of features.

Embodiments of the present invention are directed to a system for anomaly detection using machine learning. A non-limiting example of the system includes a process configured to perform receiving, by a processor, a training data set comprising a plurality of labelled time series of signal values from a track circuit in a grade crossing predictor system, removing one or more non-unique values from each labelled time series of signal values in the plurality of labelled time series of signal values, extracting a plurality of features from the plurality of labelled time series of signal values, the plurality of features comprising: a number of signal values for each labeled time series of signal values in the plurality of labelled time series of signal values that are larger than a first threshold and a standard deviation for each labelled time series of signal values in the plurality of labelled time series of signal values, and training a machine learning algorithm utilizing the plurality of features.

Embodiments of the invention are directed to a computer program product for anomaly detection using machine learning, the computer program product comprising a computer readable storage medium having program instructions embodied therewith. The program instructions are executable by a processor to cause the processor to perform a method. A non-limiting example of the method includes receiving, by a processor, a training data set comprising a plurality of labelled time series of signal values from a track circuit in a grade crossing predictor system, removing one or more non-unique values from each labelled time series of signal values in the plurality of labelled time series of signal values, extracting a plurality of features from the plurality of labelled time series of signal values, the plurality of features comprising: a number of signal values for each labeled time series of signal values in the plurality of labelled time series of signal values that are larger than a first threshold and a standard deviation for each labelled time series of signal values in the plurality of labelled time series of signal values, and training a machine learning algorithm utilizing the plurality of features.

Additional technical features and benefits are realized through the techniques of the present invention. Embodiments and aspects of the invention are described in detail herein and are considered a part of the claimed subject matter. For a better understanding, refer to the detailed description and to the drawings

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams, or the operations described therein without departing from the spirit of the invention.

DETAILED DESCRIPTION

Figure 1:
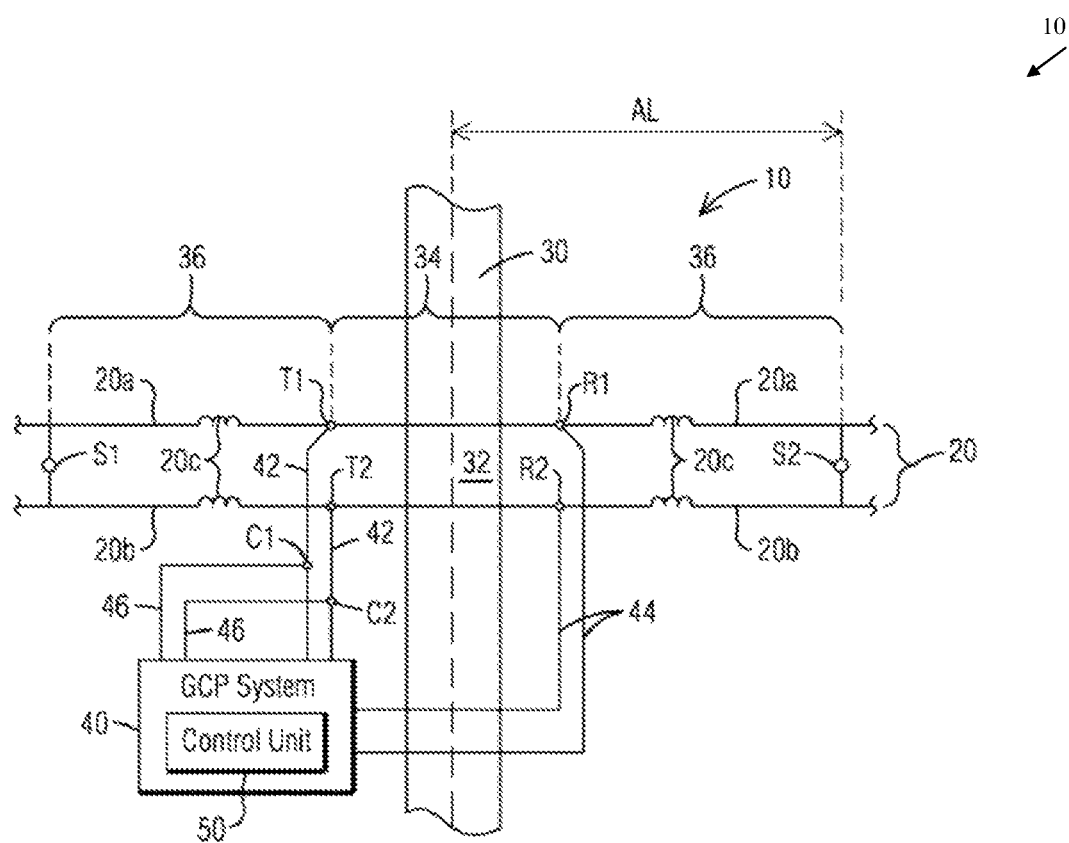
FIG. 1 illustrates a railroad crossing control system in accordance with a disclosed embodiment.

FIG. 1 illustrates a railroad crossing control system 10 in accordance with a disclosed embodiment. Road 30 crosses a railroad track 20. The crossing of the road 30 and the railroad track 20 forms an island 32. The railroad track 20 includes two rails 20a, 20b and a plurality of ties (not shown in FIG. 1) that are provided over and within railroad ballast (not shown in FIG. 1) to support the rails 20a, 20b. The rails 20a, 20b are shown as including inductors 20c. The inductors 20c, however, are not separate physical devices but rather are shown to illustrate the inherent distributed inductance of the rails 20a, 20b.

The system 10 includes a constant warning time device 40, herein also referred to as grade crossing predictor (GCP) or GCP system 40, which includes a transmitter that connects to the rails 20a, 20b at transmitter connection points T1, T2 on one side of the road 30 via transmitter wires 42. The constant warning time device 40 also includes a main receiver that connects to the rails 20a, 20b at main receiver connection points R1, R2 on the other side of the road 30 via receiver wires 44. The receiver wires 44 are also referred to as main channel receiver wires. The constant warning time device 40 further includes a check receiver that connects to the rails 20a, 20b at check receiver connection points C1, C2 via check channel receiver wires 46. The check channel receiver wires 46 are connected to the track 20 on the same side of the road 30 as the transmitter wires 42, resulting in a six-wire system. The main channel receiver and check channel receiver operate in much the same manner with an incoming train move, providing a parallel check of the main channel operation. Those of skill in the art will recognize that the transmitter and receivers (main channel receiver and check channel receiver), other than the physical conductors that connect to the track 20, are often co-located in an enclosure located on one side of the road 30.

The GCP system 40 includes a control unit 50 connected to the transmitter and receivers. The control unit 50 includes logic, which may be implemented in hardware, software, or a combination thereof, for calculating train speed, distance and direction, and producing constant warning time signals for the railroad crossing system 10. The control unit 50 can be for example integrated into a central processing unit (CPU) module of the GCP system 40 or can be separate unit within the GCP system 40 embodied as a processing unit such as for example a microprocessor.

Also shown in FIG. 1 is a pair of termination shunts S1, S2, one on each side of the road 30 at a desired distance from the center of the island 32. It should be appreciated that FIG. 1 is not drawn to scale and that both shunts S1, S2 are approximately the same distance away from the center of the island 32. The termination shunts S1, S2, are arranged at predetermined positions corresponding to an approach length AL required for a specific warning time (WT) for the GCP system 40. For example, if a total WT of 35 seconds (which includes 30 seconds of WT and 5 seconds of reaction time of the GCP system 40) at 60 mph maximum authorized speed (MAS) of a train is required, a calculated approach length AL is 3080 feet. Thus, the shunts S1, S2 are arranged each at 3080 feet from the center of the island 32. It should be noted that one of ordinary skill in the art is familiar with calculating the approach length AL. The termination shunts S1, S2 can be embodied for example as narrow band shunts (NBS).

Typically, the shunts S1, S2 positioned on both sides of the road 30 and the associated GCP system 40 are tuned to the same frequency. This way, the transmitter can continuously transmit one AC signal having one frequency, the receiver can measure the voltage response of the rails 20a, 20b and the control unit 50 can make impedance and constant warning time determinations based on the one specific frequency. When a train crosses one of the termination shunts S1, S2, the train's wheels and axles act as shunts, which lower the inductance, impedance, and voltage measured by the corresponding control unit 50. Measuring the change in the impedance indicates the distance of the train and measuring the rate of change of the impedance (or integrating the impedance over time) allows the speed of the train to be determined. FIG. 1 further illustrates an island circuit 34 which is the area between transmitter connection points T1, T2 and main receiver connection points R1, R2. For example, the constant warning time device 40 monitors the island circuit 34 as well as approach circuits 36 which lie to the right and left of the island circuit 34, i.e., between the island circuit 34 and the termination shunts S1, S2.

Turning now to an overview of technologies that are more specifically relevant to aspects of the invention, GCP systems that utilize a variety of track circuits (including island circuits) can exhibit anomalous behavior. As mentioned above, typical methods of detecting anomalous behavior of the track circuits are currently detected by an engineer manually going through the IPIZ and IMAG signals corresponding to each train crossing and identify which sequences performed abnormal behavior.

Turning now to an overview of the aspects of the invention, one or more embodiments of the invention address the above-described shortcomings of the prior art by providing a machine learning algorithm based on a support vector machine (SVM) to learn the proper and anomalous behavior of a grade/level crossing system for a railroad system. Training a machine learning model can utilize two features that are extracted from the IPIZ and IMAG signals. These features can include the number of samples that are greater than a pre-determined threshold value but are smaller than a maximum IPIZ value that is possible for the grade/level crossing system. This predetermined threshold value can be determined by domain experts based on manual observation for anomaly detection. Additionally, the features can include the standard deviation of a snippet of the signal considering only the unique values of the IPIZ/IMAG Signal. Herein, the "snippet" of a signal includes one cycle of an IPIZ time series. The standard deviation is taken for a snippet but only the unique values of IPIZ are considered. For example, if a snippet includes IPIZ=[100 100 100 100 100 100 140 130 180 200 200 200], the standard deviation will be taken after removing non-unique values (e.g., 100, 200) to get a modified time series IPIZ*=[100 140 130 180 200]. This modified time series IPIZ* includes all the unique values but has removed the repeated or non-unique values which are, in this case, repetition of the same value. The standard deviation of the time series with the non-unique values removed (i.e., IPIZ*) is then taken and utilized as a feature herein. By considering only the unique values, the system can omit the influence of train speed on the corresponding feature.

GCPs, typically, rely on the changes in the electrical characteristics of the rails that occur as a train approaches the point at which the GCP is connected to the rails (i.e., the feed point). A railroad track occupied by a train or other electrical shunt can be viewed as a single-turn inductor shaped like a hairpin. As the train approaches the feed point, the area enclosed by the inductor diminishes, thus reducing the inductance. This inductance can be measured by connecting a constant-current alternating current source to the rails and measuring the voltage. By Ohm's Law, the voltage measured will be proportional to the impedance (IPIZ). The absolute magnitude (IMAG) of this voltage and its rate of change can then be used to compute the amount of time remaining before the train arrives at the crossing, assuming it is running at a constant speed.

Figure 2:
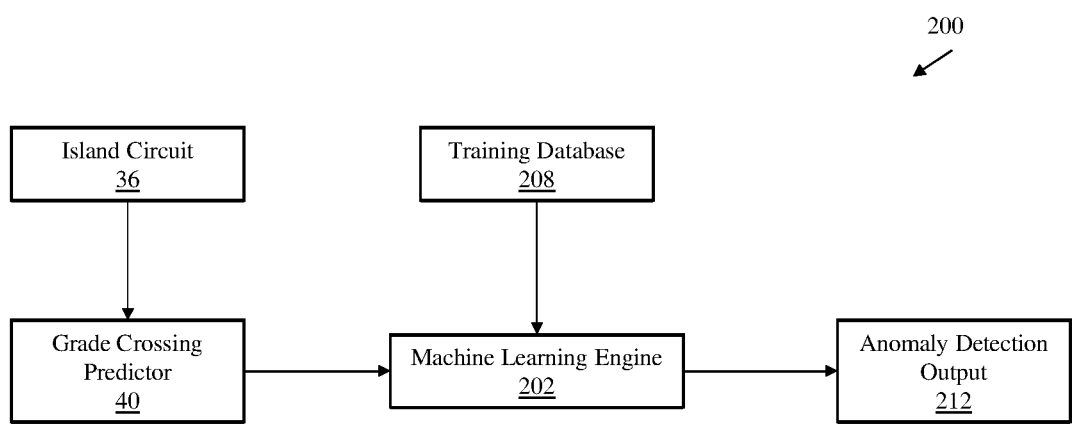
FIG. 2 depicts a block diagram of a system for anomaly detection in a railroad crossing control system according to one or more embodiments.

Turning now to a more detailed description of aspects of the present invention, FIG. 2 depicts a block diagram of a system for anomaly detection in a railroad crossing control system according to one or more embodiments. The system 200 includes a machine learning engine 202 that is configured to receive signal data from a grade crossing predictor (GCP) 40. The GCP 40 is in electronic communication with one or more island circuits 36 for a railroad crossing. The machine learning engine 202 is also in electronic communication with a training database 208 that can store training data for a machine learning model that may be implemented utilizing the machine learning engine 202. The system 200 also includes an anomaly detection output 212 that is in electronic communication with the machine learning engine 202.

In one or more embodiments, the system 200 can be utilized for the detection of anomalous signals in a grade crossing predictor (GCP) system. The system 200 utilizes machine learning techniques implemented in the machine learning engine 202 to determine anomalous signals. A machine learning algorithm, such as a support vector machine (SVM) classifier, is trained and tested utilizing training data stored in the training database 208. The training data can be signal data taken from island circuits 36 at various grade crossings that have been labeled utilizing various techniques. The signal data can be segmented in to multiple time series of signal values (snippets) corresponding to IPIZ and/or IMAG signal data. IPIZ is the impedance (Z) level of the island circuit 36 that is shown in a value range between 0 and 250. The IMAG or IMG is the raw data value for the signal level and can range from 0 to 9999. If the signal level is 250 or less, the IPIZ and IMAG values will be the same. If the signal level is over 250, the IPIZ will show as 250 and the IMAG will show as the actual value. The island circuit 36 covers the track going through the road and is a positive lock for the GCP 40. If the signal level is less than 100, the island circuit 36 is shown as occupied and the crossing will be active. If the signal level is 100 or higher, the circuit will be shown as clear.

As mentioned above, when a train is present on a track at or near a grade crossing, the train's wheel and axles act as shunts which lower the inductance, impedance, and voltage measured by the track (island) circuits. The training data can be taken from historical signal data and labeled as normal or abnormal (anomalous) signal data. When training the SVM, two features are extracted from the historical signal data (i.e., training data). The first feature is the number of signal values within a time series of signal values (i.e., a snippet) that are higher than a specific threshold value but smaller than the maximum IPIZ (e.g., 250). This threshold value can be determined by domain experts or utilizing other techniques. The second feature is the standard deviation of the time series of signal values but considering only the unique values. That is to say, in a training data set, part of that data set can be omitted for training the machine learning algorithm. The machine learning engine 202 can be utilized to omit these values from the training set to enhance the training process. As mentioned above, training data is taken from historical signal data for IPIZ signals and/or IMAG signals; however, train speed can influence how the SVM determines whether the data should be labeled as either normal or abnormal.

In one or more embodiments, the SVM or other machine learning algorithm can be trained utilizing the training set. Training techniques include optimizing hyper parameters of the SVM or other machine learning algorithms based on the labeled training data. The optimized classifier can then be trained based on the extracted features and generated feature vectors and saved for further anomaly detection of the signal values. After one or more training sets are utilized for training the SVM or other machine learning algorithms, a test step can be implemented where the SVM or other machine learning algorithm is used to detect anomalies in a test set of labeled training data. Based on the test results, the SVM or other machine learning algorithms can be tuned again using new training data before implementation for detecting anomalies in a grade crossing prediction system. In one or more embodiments, training can be performed by the SVM or other machine learning algorithm extracting features from the training data set along with the associated label for the labeled signals. The extracted features are then inputted into a feature vector which can be analyzed to determine anomalous signals from a track circuit. The feature space is saved for future testing and implementation of the SVM or other machine learning algorithms in a grade crossing predictor system.

In one or more embodiments, the system 200 predicts anomalous behavior in a grade crossing predictor 40 by implementing the SVM or other machine learning algorithms in the machine learning engine 202. After the training and testing steps outline above, the machine learning engine 202 can receive signal data from the grade crossing predictor 40 which collects this data from a track circuit (i.e., island circuit 36). The machine learning engine 202 analyzes this signal data and identifies signal data that are anomalous based on extracted features from the signal data. These features include the number of signal values in a time series of signal values that exceed a threshold value but are smaller than the maximum IPIZ value (e.g., 250) and the standard deviation for the time series of signal values (snippets) that are unique values. As described above, the unique values include non-repeating signal values. The repeating signal values are removed before the standard deviation is calculated and utilized for a feature. The anomalous behavior can be output to the anomaly detection output 212 which can be a display screen or software program that displays on a display screen. In one or more embodiments, the unique values can be signal values that are within a certain range of signal values in a time series. For example, for a time series of IPIZ values equal to [100 101 100 104 120 121 130 130 180 200 201 204], values that are within a certain range of each other can be removed so that the unique values are consider (e.g., IPIZ*=[100 120 130 180 200]) and the standard deviation is taken for just the unique values. Other methods can be utilized where an average of the signal values within the time series are taken or a median value is taken. So, for example, for the following time series IPIZ= [98 99 100 101 102 140 160 190], the values of 98 99 100 101 102 can be determined to be within a certain range of the other values within the time series and an average IPIZ signal value can be taken so that the average of 100 remains and is utilized as a unique value for calculating the standard deviation (i.e., IPIZ*=[100 140 160 190]).

In one or more embodiments, the system 200 can include an alert/alarm system that can generate an alert or alarm when anomalous behavior is detected. The alert or alarm can indicate a need to inspect the grade crossing location and/or replace one or more track or island circuits in the system 200. In one or more embodiments, the anomalous behavior could be an indication of need for maintenance of the system. It could as well be caused by some weather conditions, presence of some obstacles on the track which prevents the electric circuit from functioning normally. In any case the anomalous signals should raise an alarm for a manual control of the track. In embodiments of the invention, the machine learning engine 202 can also be implemented as a so-called classifier (described in more detail below). In one or more embodiments of the invention, the features of the various engines/classifiers (202) described herein can be implemented on a processing system. In embodiments of the invention, the features of the engines/classifiers 202 can be implemented by configuring and arranging a processing system to execute machine learning (ML) algorithms. In general, ML algorithms, in effect, extract features from received data (e.g., inputs to the engines 202) in order to "classify" the received data. Examples of suitable classifiers include but are not limited to neural networks, support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 202 can be supervised, unsupervised, or a hybrid that includes aspects of supervised and unsupervised learning. Supervised learning is when training data is already available and classified/labeled. Unsupervised learning is when training data is not classified/labeled so the labels should be learned and decided by the classifier. Unsupervised learning can utilize additional learning/training methods including, for example, clustering, anomaly detection, neural networks, and the like.

In one or more embodiments, the machine learning engine 202 or any of the hardware referenced in the system 200 can be implemented by executable instructions and/or circuitry such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form.

Figure 3:
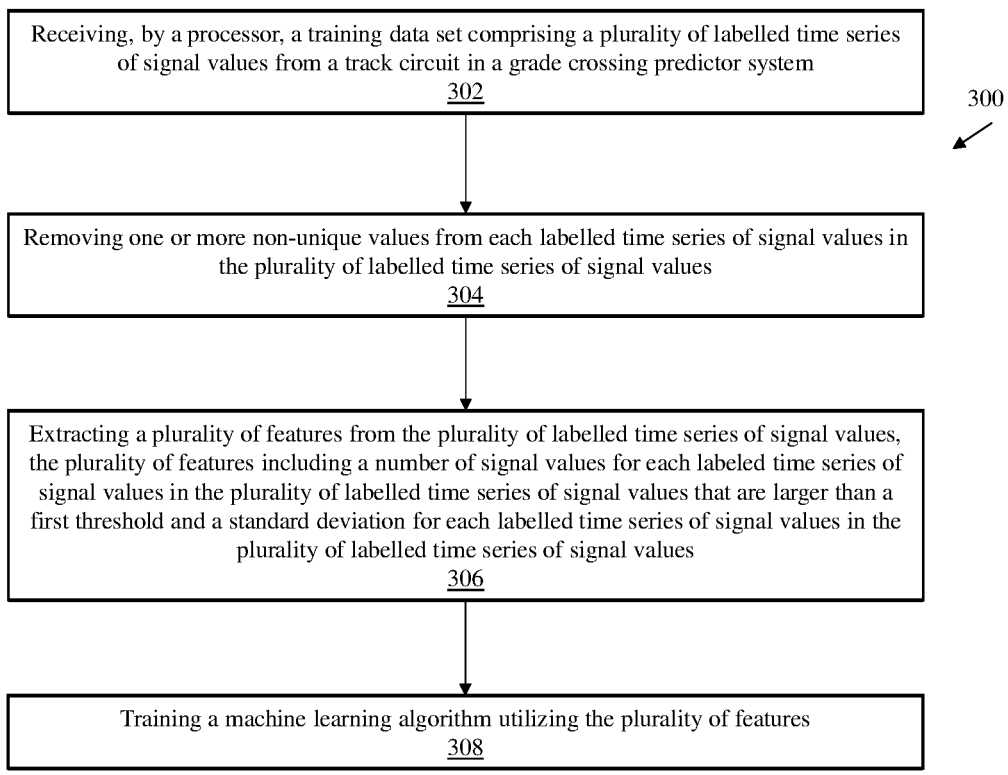
FIG. 3 depicts a flow diagram of a method for anomaly detection using machine learning according to one or more embodiments of the invention.

FIG. 3 depicts a flow diagram of a method for anomaly detection using machine learning according to one or more embodiments of the invention. The method 300 includes receiving, by a processor, a training data set comprising a plurality of labelled time series of signal values from a track circuit in a grade crossing predictor system, as shown in block 302. At block 304, the method 300 also includes removing one or more non-unique values from each labelled time series of signal values in the plurality of labelled time series of signal values. Further, the method 300 includes extracting a plurality of features from the plurality of labelled time series of signal values, the plurality of features including a number of signal values for each labeled time series of signal values in the plurality of labelled time series of signal values that are larger than a first threshold and a standard deviation for each labelled time series of signal values in the plurality of labelled time series of signal values, as shown at block 306. And at block 308, the method 300 includes training a machine learning algorithm utilizing the plurality of features.

Additional processes may also be included. It should be understood that the processes depicted in FIG. 3 represent illustrations, and that other processes may be added, or existing processes may be removed, modified, or rearranged without departing from the scope and spirit of the present disclosure.

Figure 4:
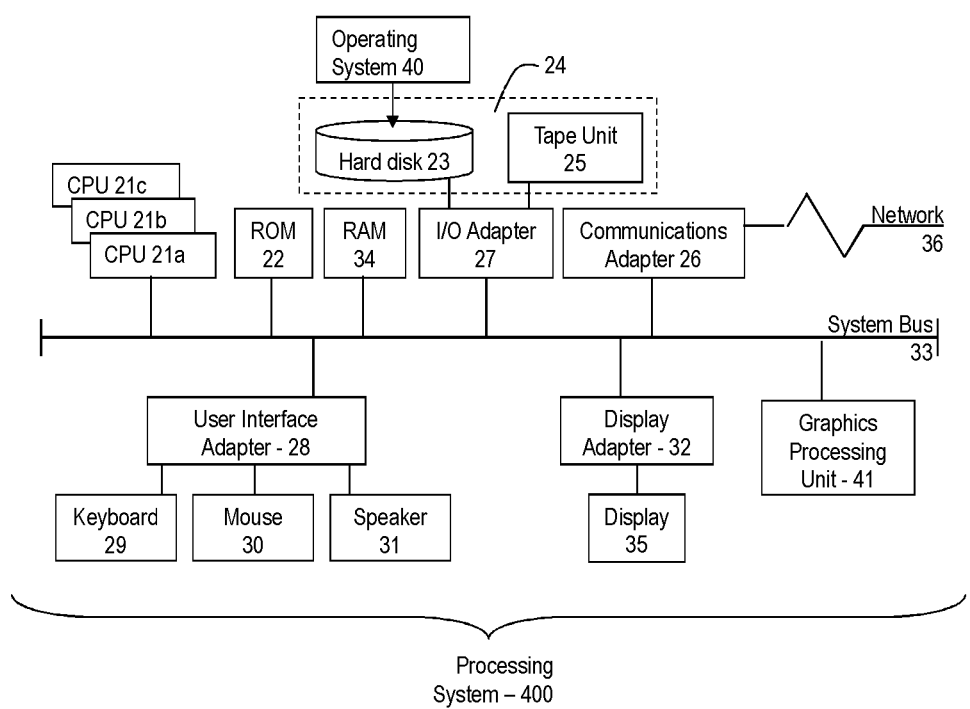
FIG. 4 depicts a block diagram of a computer system for use in implementing one or more embodiments of the present invention.

Referring to FIG. 4, there is shown an embodiment of a processing system 400 for implementing the teachings herein. In this embodiment, the system 400 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 400.

FIG. 4 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 400 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 400 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 4, the system 400 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   receiving, by a processor, a training data set comprising a plurality of labelled time series of signal values from a track circuit in a grade crossing predictor system;
   removing one or more non-unique values from each labelled time series of signal values in the plurality of labelled time series of signal values to create a first set of labelled time series of signal values;
   extracting a plurality of features from the plurality of labelled time series of signal values, the plurality of features comprising:
      a number of signal values for each labeled time series of signal values in the first set of labelled time series of signal values that are larger than a first threshold and smaller than a maximum impedance value;
      a standard deviation for each labelled time series of signal values in the first set of labelled time series of signal values;
   training a machine learning algorithm utilizing the plurality of features.

2. The method of claim 1, wherein training the machine learning algorithm utilizing the plurality of features comprises:
   generating, by the machine learning algorithm, a plurality of feature vectors comprising the plurality of features for each time series of signal values and an associated label; and
   storing the plurality of feature vectors for each time series of signal values and the associated label.

3. The method of claim 1, further comprising:
   determining one or more anomalous signal values in a second grade level prediction system by:
      receiving track crossing data from a second track circuit in the second grade level prediction system, wherein the track crossing data comprises a second plurality of time series of signal values associated with the second track circuit, wherein each time series of the second plurality of time series of signal values comprises one cycle of measured impedance values associated with the second track circuit; and
      generating, by the machine learning algorithm, a feature vector comprising a second plurality of features extracted from the track crossing data;

determining a first anomalous signal based on the feature vector.

4. The method of claim 3, further comprising removing one or more non-unique values from each time series of signal values in the second plurality of time series of signal values;
wherein the second plurality of features comprise:
a number of signal values for each time series of signal values in the plurality of time series of signal values that are larger than the first threshold and smaller than a maximum impedance value; and
a standard deviation for each time series of signal values in the plurality of time series of signal values.

5. The method of claim 1, wherein the one or more non-unique values comprise repeating signal values within each labelled time series of signal values in the plurality of labelled time series of signal values.

6. The method of claim 1, wherein the machine learning algorithm comprises a support vector machine.

7. The method of claim 1, wherein the track circuit comprises an island circuit.

8. A system for anomaly detection in a grade crossing prediction system, the system comprising:
a processor communicatively coupled to a memory, the processor configured to perform:
receiving, by the processor, a training data set comprising a plurality of labelled time series of signal values from a track circuit in a grade crossing predictor system;
removing one or more non-unique values from each labelled time series of signal values in the plurality of labelled time series of signal values to create a first set of labelled time series of signals;
extracting a plurality of features from the plurality of labelled time series of signal values, the plurality of features comprising:
a number of signal values for each labeled time series of signal values in the first set of labelled time series of signal values that are larger than a first threshold and smaller than a maximum impedance value;
a standard deviation for each labelled time series of signal values in the first set of labelled time series of signal values;
training a machine learning algorithm utilizing the plurality of features.

9. The system of claim 8, wherein training the machine learning algorithm utilizing the plurality of features comprises:
generating, by the machine learning algorithm, a plurality of feature vectors comprising the plurality of features for each time series of signal values and an associated label; and
storing the plurality of feature vectors for each time series of signal values and the associated label.

10. The system of claim 8, further comprising:
determining one or more anomalous signal values in a second grade level prediction system by:
receiving track crossing data from a second track circuit in the second grade level prediction system, wherein the track crossing data comprises a second plurality of time series of signal values associated with the second track circuit; and
generating, by the machine learning algorithm, a feature vector comprising a second plurality of features extracted from the track crossing data;
determining a first anomalous signal based on the feature vector.

11. The system of claim 10, further comprising
removing one or more non-unique values from each time series of signal values in the plurality of time series of signal values;
wherein the second plurality of features comprise:
a number of signal values for each time series of signal values in the plurality of time series of signal values that are larger than the first threshold; and
a standard deviation for each time series of signal values in the plurality of time series of signal values.

12. The system of claim 8, wherein the one or more non-unique values comprise repeating signal values within each labelled time series of signal values in the plurality of labelled time series of signal values.

13. The system of claim 8, wherein the machine learning algorithm comprises a support vector machine.

14. The system of claim 8, wherein the track circuit comprises an island circuit.

15. A computer program product for anomaly detection in a grade crossing prediction system, the computer program product being on a computer readable storage medium having program instructions embodied therewith, the program instructions executable by a processing device to cause the processing device to perform a method comprising:
receiving, by the processing device, a training data set comprising a plurality of labelled time series of signal values from a track circuit in a grade crossing predictor system;
removing one or more non-unique values from each labelled time series of signal values in the plurality of labelled time series of signal values to create a first set of labelled time series of signal values;
extracting a plurality of features from the plurality of labelled time series of signal values, the plurality of features comprising:
a number of signal values for each labeled time series of signal values in the first set of labelled time series of signal values that are larger than a first threshold and smaller than a maximum impedance value;
a standard deviation for each labelled time series of signal values in the first set of labelled time series of signal values;
training a machine learning algorithm utilizing the plurality of features.

16. The computer program product of claim 15, wherein training the machine learning algorithm utilizing the plurality of features comprises:
generating, by the machine learning algorithm, a plurality of feature vectors comprising the plurality of features for each time series of signal values and an associated label; and
storing the plurality of feature vectors for each time series of signal values and the associated label.

17. The computer program product of claim 15, further comprising:
determining one or more anomalous signal values in a second grade level prediction system by:
receiving track crossing data from a second track circuit in the second grade level prediction system, wherein the track crossing data comprises a second plurality of time series of signal values associated with the second track circuit; and
generating, by the machine learning algorithm, a feature vector comprising a second plurality of features extracted from the track crossing data;
determining a first anomalous signal based on the feature vector.

18. The computer program product of claim 17, further comprising
- removing one or more non-unique values from each time series of signal values in the plurality of time series of signal values;
- wherein the second plurality of features comprise:
  - a number of signal values for each time series of signal values in the plurality of time series of signal values that are larger than the first threshold; and
  - a standard deviation for each time series of signal values in the plurality of time series of signal values.

19. The computer program product of claim 15, wherein the one or more non-unique values comprise repeating signal values within each labelled time series of signal values in the plurality of labelled time series of signal values.

20. The computer program product of claim 15, wherein the machine learning algorithm comprises a support vector machine.

* * * * *